United States Patent

Lennie

[15] 3,635,423

[45] Jan. 18, 1972

[54] CARTRIDGE-LOADING MEANS AND METHOD FOR TAPE RECORDER

[72] Inventor: Kenneth B. Lennie, Scarborough, Ontario, Canada

[73] Assignee: 230494 Merchandising Limited, Toronto, Ontario, Calif.

[22] Filed: Feb. 5, 1970

[21] Appl. No.: 8,945

[52] U.S. Cl. ....................242/198, 274/4 F

[51] Int. Cl. ....................G03b 1/04, G11b 15/32, G11b 23/04

[58] Field of Search ....................242/197–200; 274/4 F, 11 C; 179/100.2 Z

[56] References Cited

UNITED STATES PATENTS 2,969,929 1/1961 Rudzitis ....................242/199

3,043,531 7/1962 Sinkewitsch ....................242/198 X 3,167,267 1/1965 Crane ....................242/198

3,273,815 9/1966 Schuller ....................242/198 X

*Primary Examiner*—Leonard D. Christian

*Attorney*—Westell & Hanley

[57] ABSTRACT

Loading or unloading a "cassette" tape recorder cartridge is facilitated by a cartridge holder which allows: insertion and withdrawal of the cartridge into a cartridge holder diagonally between upwardly and downwardly projecting tape recorder spindles; after insertion of the cartridge in this manner, pivoting the cartridge in the holder into operative position on the spindles; and before withdrawal of the cartridge, pivoting the cartridge in the holder out of operative connection with the spindles and into the diagonal withdrawal position.

3 Claims, 5 Drawing Figures

INVENTOR.
KENNETH B. LENNIE
BY
Westell & Hanley

INVENTOR.
KENNETH B. LENNIE
BY
Westell & Hanley

INVENTOR.
KENNETH B. LENNIE
BY
Westell & Hanley

CARTRIDGE-LOADING MEANS AND METHOD FOR TAPE RECORDER

This application relates to the means for application to and withdrawal of a cartridge of a certain type from a tape recorder. The cartridge type is primarily exemplified by the 'cassette' developed by Philips Electronics Industries Limited. The cartridge with which the invention is concerned, is a cartridge of the type having a pair of rotatably mounted reels for the winding of magnetic sensitive tape on one reel and the unwinding of such tape on the other reel with means defining a tape path along one side of the cartridge, where an extent of the tape between the reels is defined along one side of the cartridge in use, located adjacent one or more heads designed to cooperate with the tape in the transfer of magnetic energy in such cartridge associated with the record, transcribe, or erase operation. The tape is propelled by a drive spindle located adjacent to and on the side of said tape extent nearer the line joining the centers of the tape reel and oriented for driving the tape when a pressure roll presses the tape into contact with the drive spindle; and the spindle and pressure roller are oriented so that the tape is travelling tangentially relative to the spindle, and wherein feed and takeup spindles are coupled to the reels in driving relationship or keyed relationship through apertures in the cartridge allowing access to keyed or keyable bores in the reels.

Prior methods of inserting or 'loading' a cartridge of the above type in the recorder, for operation as above, have involved, most commonly moving the cartridge into position in the direction of axial extension of the spindles. A second prior method involves the use of retractable spindle free ends with insertion or loading movement of the cartridge at right angles to the spindle axes and causing or allowing after insertion the spindles to move axially into the cartridge.

Both the above methods have been difficult for the user and have involved expensive manufacturing costs in putting into practice the design of the tape recorder to accomplish these functions. This invention provides a design for loading such a cartridge in the tape recorder in the manner previously described which is both easier to operate and much easier to manufacture.

In the cartridge with which the invention is concerned, the centers of the two reels define a line and a second line approximately parallel thereto is defined by the extent of tape along one side of the cartridge exposed for driving contract with the drive spindle and for receipt or communication of the magnetic impulses transferred between the tape and record, transcribe and erase heads. A cartridge holder is provided, swingably mounted on the recorder, and designed to receive, as hereinafter described, the cartridge in a predetermined datum location, with the cartridge holder being designed to move swingably about axes at least approximately intermediate the two lines, while the cartridge is in the datum position therein.

The term 'axes' is used although the cartridge holder will usually pivot between the loading and use positions for the cartridge about a single axis. However, it may be, that in some applications, within the scope of the invention, that for some reason ancillary to the purposes of the invention, the axis will move on a locus between the two cartridge positions remaining approximately parallel to the two lines.

The feed and takeup spindles are designed to terminate in free-ends projection from the tape recorder in one direction (say upwardly); while the drive spindle is designed to terminate in a free end projecting from the tape recorder in the other direction (in the example—down). It will be seen that, with the free ends thus disposed and limited substantially to their necessary length, there is a diagonal direction in which the cartridge may be moved into the cartridge holder between the free ends, and diagonally with respect to the spindle axes. Therefore, the cartridge holder is designed to assume a first position so that it may receive the cartridge moving diagonally between the free ends of the feed and takeup spindles, on the one hand, and the drive spindle on the other hand, and, after the loading of the cartridge in the holder, to rotate the cartridge, relative to the tape recorder into position where its reel bores receive the feed and takeup spindles and the drive spindle is located in driving orientation adjacent the tape extent on the side thereof nearer the line joining the reel spindles.

Thus, applicant's invention lies, in adapting the tape recorder to have the parallel spindles for feed and takeup on the one hand and drive on the other terminating in free ends extending in opposite directions so that a diagonal space is available between such free ends into which a cartridge may be moved and thereafter swung relative to the tape recorder about an axis approximately perpendicular to the spindle axes and parallel to the line joining the feed and takeup spindle, parallel to the extent of tape where the drive spindle will be coupled, and with the axis located between the line and such tape extent. The movement about this axis will continue until the reel bores of the cartridge receive the drive and takeup spindles and the drive spindle is located adjacent the tape extent.

In drawings which illustrate a preferred embodiment of the invention:

Figure 1:
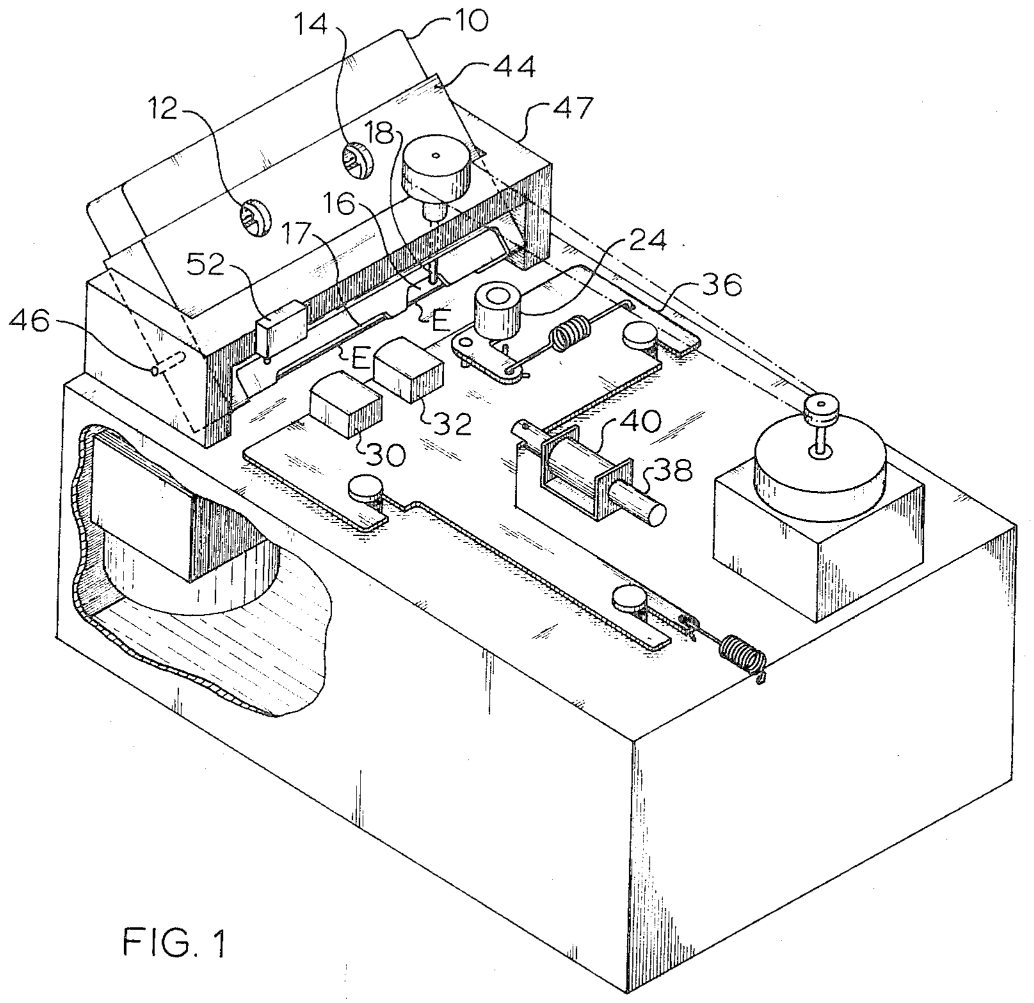
FIG. 1 is a view which shows a perspective of a dictating machine designed to use applicant's inventive loading means.

In the drawings in shown a cartridge 10 which is of common design having a reel corresponding to each of the apertures 12 and 14 shown, with means defining a tape path therebetween. The guide rollers and surfaces for defining this path are well known to those skilled in the art as is the variety of paths available. The tape path will, however, include an extent of tape shown as 'E' along one side of the cartridge. The cartridge is cut away as shown to expose the tape on such extent at two locations 16 and 17. At location 16 the cartridge is cut away to allow (when the cartridge is correctly positioned on the recorder for use) with spindles received in the reel bores, insertion of a drive spindle 18 having its axis parallel to the plane of the tape, and perpendicular to the tape travel direction, and on the side of the tape adjacent the line joining the feed and takeup apertures. At location 17 also on the extent along the side of the cartridge, the tape is exposed so that one or more of the record, erase and transcribe heads may be brought into close proximity thereto. Thus the cartridge in use, has feed and takeup spindles 40 and 42 in coupling relationship with the reels, the feed and takeup spindles 40 and 42 having access to the apertures in the cartridge, and with driving achieved by a pressure roller 24 pressing the tape along the exposed extent against the drive spindle 18 so that the tape may be driven with the tape moving tangentially to both the drive spindle 18 and pressure roller 24. Members 30 and 32 represent heads which each or either may perform one or more of the record, erase or transcription functions in accord with techniques and designs well known to those skilled in the art and each involving the transfer of magnetic flux in one direction or the other between the head involved and the tape. Thus, as shown in FIG. 1, the heads 30 and 32 and the pressure roller 24 may be mounted on a plate 36 and solenoid actuated as exemplified by the core 38 controlled by solenoid 40 with the core 38 attached to plate 36 to move forwardly therewith, to move into position adjacent the tape tents 16 and 17 with the pressure roller 24 pressing the tape against the drive spindle 18. Also as schematically shown when the core 38 is not energized to the forward position the plate 36, core 38 and heads 30 and 32 are moved rearwardly by spring 41 attached to the recorder frame.

The method of operating and achieving the connection to the tape, with the cartridge in operational connection to the machine, so far described, is conventional, with the exception that, in accord with the object of the invention to provide for easy loading and unloading of the cartridge, the feed and takeup spindles 40 and 42 have free ends projecting in one direction (here upwardly) and the drive spindle has a free end projecting in the opposite direction (here downwardly) so that there is a diagonal space between the oppositely directed spindle free ends for the insertion of the cartridge.

Although it forms no part of the present invention, the function of the feed, takeup and drive spindles in machines with which the cartridge and the invention is used is referred to herein. When, with a cartridge as described herein, it is desired to move the tape forward or rearward, the master drive is supplied by the drive spindle, with the tape pressed against the drive spindle by a pressure roller, at a tape extent, intermediate the two reels. Drives are however also supplied for the takeup and feed reels. Since the tape may be driven in either direction, the functions of the feed and takeup rollers interchange. The drives for the feed and takeup rollers are, by means forming no part of the present invention, but well known to those skilled in the art, subservient or slaves to the drive spindle and serve only to feed or takeup tape as dictated by the latter.

The tape recorder in accord with the invention provides a holder 44 pivotally mounted on a frame 47 which is turn is mounted on the tape recorder frame. The tape recorder body proper mounts the drive and takeup reels projecting upwardly from the main chassis of the tape recorder, beneath the frame, and the frame 47 mounts the drive provided in any manner well known to those skilled in the art and is here shown as a belt drive, but merely as exemplary of one of the many possible methods.

In the drawings, the cartridge holder is accordingly shown as pivotally mounted on the frame 47 to pivot about an axis 46 as defined by pins connecting the cartridge holder to the frame.

Figure 2:
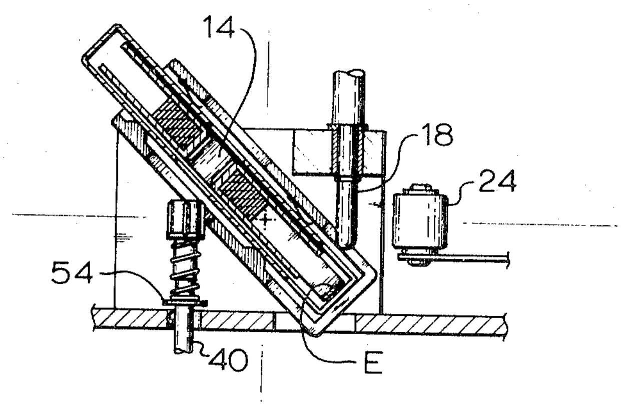
FIGS. 2–4 are sectional views which show the loading sequence for use with the invention.
Figure 3:
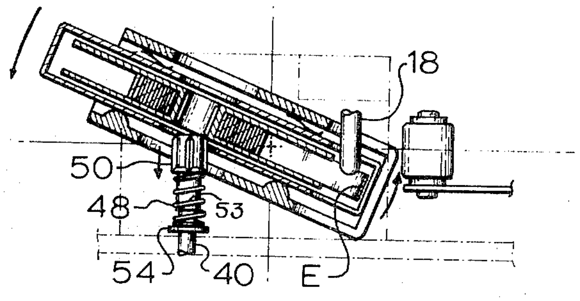
Figure 4:
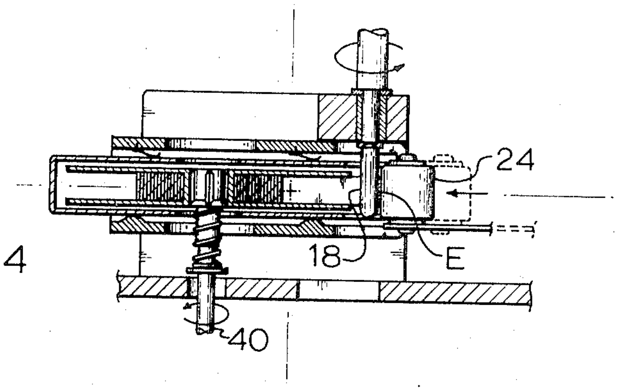
Figure 5:
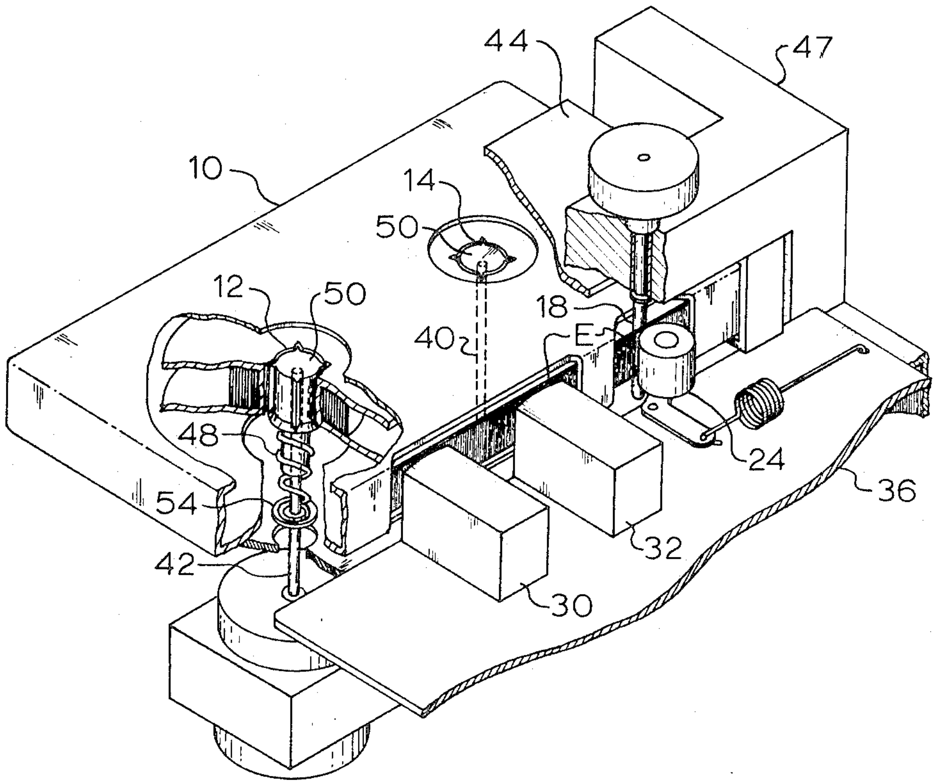
FIG. 5 shows a perspective of a cartridge located for dictation.

The axis 46 is, relative to the dictating machine, located between the line joining the feed and takeup spindles and a parallel line through drive spindle 18. The cartridge holder 44 is designed to slidably receive the cartridge in the attitude indicated, relative thereto; and the holder is designed to allow the slidable insertion of the cartridge in the holder along a line perpendicular to axis 46, and the cartridge is slid into place with the width dimension travelling perpendicular to this line. The cartridge is inserted in this direction with the cartridge holder diagonally disposed between the free ends of the feed and takeup spindles, on the one hand and the drive spindle on the other hand until the datum position relative to the holder is reached, being the position shown in the drawings. The cartridge may be retained in its datum position in the cartridge holder, between its insertion therein and its coupling to the feed and takeup spindles of the machine. This would be by some simple releasable clip, not shown. However the preferred form of the invention merely contemplates the cartridge holder being designed to stop the inwardly sliding cartridge at the datum location, and the cartridge being manually held in position after insertion, until it is coupled, and hence held in its operational position by the feed and takeup spindles. Thus the predetermined datum position in the holder is selected relative to the swingable movement about the axis 46 so that when the cartridge holder and cartridge are swung from the position of FIG. 2 to the position of FIG. 4 the cartridge feed and takeup bores 12 and 14 are swung downwardly and the tape-exposed extent is swung upwardly as shown in FIGS. 2, 3 and 4. The feed and takeup spindles are each provided with a telescoping member 48 having a keying member 50 of any conventional design to couple a complementary key slot defined in the reel bore 12 or 14. The telescoping member is biased to its coupling position by a compression spring 53 bearing at one end on the keying member 48 and at the other end on a shoulder 54 having a fixed position on the spindle. Thus, when the cartridge holder and cartridge swing about axis 46 the reel and bore move downwardly on an arc and there is initially interference between the spindle-keying member 50 and the reel. While this interference continues, the keying member 50 on the spindle will continue to move downwardly until the axis of the reel bore and of the spindle-keying member are sufficiently aligned that the spindle-keying member may slide into the reel bore 12. It will be noted that if, due to lack of alignment of the complementary bore and keying members, the driving connection has still not been achieved, it will be achieved as soon as any initial rotation of either the reel or the spindle takes place during the operation of the machine. The axis 46 is also chosen in relation to drive spindle 18 so that in the movement of the cartridge and holder from the cartridge-loading position (FIG. 2) to the operational position, FIG. 4, the drive spindle, 18 being stationary, moves relative to the moving cartridge into position parallel to the plane of the tape extent at 16 and with the tape pressed there against by roller 24.

The design and operation of the recording device as such form no part of this invention nor does the means for engaging the pressure roller 24 and heads 30 and 32 in operating position relative to the tape. However these means are schematically indicated, and it is noted that the cartridge holder swinging to the operational position may be used to actuate a microswitch 52 which may close a circuit to directly actuate the solenoid 40 to move the members into position, or may be used to ready the circuit so that they can, in other words the microswitch 52, when not actuated by the cartridge holder, may prevent actuation of the other members into work position. It is noted that when the cartridge is to be withdrawn, it is swung upwardly in the reverse of the sequence of operation shown in FIGS. 2, 3 and 4 and the cartridge may be withdrawn.

It is noted that the swingable or pivoted ) between the cartridge holder and cartridge, on the one hand, and the tape recorder on the other hand, taking place during the movement of the members into or out of position relative to each other, need only be relative and does not depend on which of the members is moving and which is stationary. Thus, within the scope of the invention, as long as the described relative movement takes place, (*a*) the tape recorder may be stationary while the cartridge holder and cartridge move (as shown), (*b*the cartridge holder and cartridge may be stationary while the tape recorder moves, or (*c*) both the cartridge holder and the cartridge on the one hand and the tape recorder, on the other hand, may move.

I claim:

1. For use with a tape recorder cartridge having:

a pair of rotatably mounted tape reels, said reels having axial bores wherein feed and drive spindles may be located, means defining a path for tape extending between said reels, said path including an exposed extent of said tape along one side of the cartridge, said cartridge defining access apertures for spindles to enter said reel bores, access for record, playback and erase heads to said exposed extent, access for a drive spindle inwardly of said exposed extent to allow said spindle to be located adjacent to and inwardly of said exposed extent and parallel to the plane of said tape, but with its axis projecting perpendicular to said path, and access for a pressure roller to contact said tape by moving transversely to the plane of said tape at said extent, located to press the tape against said pressure roller;

a tape recorder defining parallel feed and takeup spindles terminating in free ends directed in the same direction and spaced and located to register with said cartridge reels for driving connection through said access apertures;

a drive spindle terminating in a free end directed in the opposite direction to said feed and takeup spindles, and located relative to said feed and takeup spindles, so that when said feed and takeup spindles are connected to said reels, said drive spindle is located adjacent to and inwardly of said exposed extent of tape and parallel to the plane of tape in said extent;

at least one head for performing at least one of the record, playback and erase functions, designed to be located in effective proximity to said tape when said cartridge is located with said feed and takeup spindles in the reel bores;

a pressure roller located on said recorder for movement into position to press tape on said extent against said drive spindle when said cartridge is located with said feed and takeup spindles located in the reel bores;

a holder for such cartridge, swingably mounted on said support, designed and mounted to swing relative to said tape recorder between a first orientation extending diagonally relative to and between the free ends of said feed and takeup spindles, on the one hand, and the free end of said drive spindle on the other hand, and a second orientation perpendicular to the axes of said spindles;

said cartridge holder being designed to detachably receive a cartridge in a datum position when in said first orientation, and designed so that in said second orientation, a cartridge located in said datum position will have said feed and takeup spindles located in said reel bores.

2. For use with a tape recorder cartridge having a pair of rotatably mounted tape reels, each reel having a central drive bore therein, designed for location therein of one and one other of a drive and takeup spindle, said cartridge being designed to allow access for feed and takeup spindles from outside of the cartridge to said bores, means defining a tape path between said reels, including an extent spaced from and approximately parallel to the line joining the centers of said tape reels;

said cartridge being designed for use with:

parallel spindles extending into each of said tape reel drive bores, in respective driving connection therewith;

and with a drive spindle parallel to the other spindles located adjacent said tape extent on the side thereof adjacent the line joining the centers of said reels, said drive spindle extending approximately parallel to the plane of tape in said extent but perpendicular to the travel direction of tape therealong, and with a pressure roller parallel to said drive spindle and located on the opposite side the tape extent therefrom designed to press the tape on said extent against said drive spindle for driving connection therebetween and for use with a head in close proximity to the tape for the transfer of energy between said head and the tape;

a tape recorder having a feed and a takeup spindle arranged for location in said reel bores for driving connection therewith and a drive spindle located and oriented to be located and oriented in relation to the tape extent as above defined when said cartridge bores are located about said pair of spindles, and a pressure roller designed, when said spindles are so located relative to said cartridge, to press tape on said tape extent against said drive spindle with a cartridge so located relative to said spindle and a head designed to be located in energy transfer proximity to said extent;

said tape recorder being characterized by having the feed and takeup spindles terminating in free ends, projecting in one direction and said drive spindle terminating in a free end projecting in the other direction;

the free ends allowing space for the diagonal insertion and withdrawal of the cartridge transverse to the line joining said feed and takeup spindles and between the free ends of the feed and takeup spindles, on the one hand, and the free end of the drive spindle on the other hand;

a cartridge holder swingably mounted relative to said recorder, designed to mount a tape recorder cartridge in a predetermined location, designed to swing relative to said recorder between a first orientation where a cartridge in said location is in driving relationship with said feed and takeup spindles, and located for positioning relative to said head, drive spindle and pressure roller, as above defined; and a second orientation allowing diagonal insertion of said cartridge as above defined;

said cartridge and feed and takeup spindles being designed to allow coupling between said last-mentioned spindles and the reel bores during the movement of said cartridge from second to said first orientation.

3. A method of installing a tape cartridge on a tape recorder where the cartridge is of the type where:

a pair of reels rotatably mounted on the tape recorder having tape connected therebetween are driven by spindles mounted on the tape recorder and in drive connection with said reel bores and defining a path for tape between said reels including an extent adjacent one side of the carriage and approximately parallel to the line joining the centers of rotation of the reels where said tape is driven by a rotatable drive spindle projecting from the tape recorder and located on the side of said tape extent adjacent the line joining the centers of rotation of the reels and oriented and rotatable to tangentially drive said tape extent when a pressure roller mounted on said tape recorder presses said tape extent against said drive spindle, and where playback, dictate and erase functions are performed by at least one head located on said carriage in proximity to said tape extent for the transfer of magnetic energy therebetween;

and where the tape recorder is provided with mutually parallel feed, takeup and drive spindles, located to make connection, as defined, with the tape reel and tape, wherein the feed and takeup spindles each project from the recorder terminating in a free end projecting in one direction and the drive spindle projects from the recorder terminating in a free end projecting in the other direction: the steps of:

mounting a cartridge on said tape recorder by inserting it between the oppositely projecting free ends of said feed and takeup spindles on the one hand and said drive spindle on the other hand;

to a position where it may be pivoted relative to said tape recorder into registration with said feed and takeup spindles and into said location relative to said drive spindle about an axis approximately parallel to a mutual perpendicular to the feed and takeup spindles said axis being located between said feed and takeup spindles on one side and said drive spindle on the other side;

and so pivoting said cartridge relative to said tape recorder.

* * * * *